June 9, 1942.  E. FENNER  2,285,424

METHOD OF MANUFACTURING FOIL-LIKE LAYERS

Filed Nov. 28, 1939

INVENTOR
ECKARD FENNER
BY
ATTORNEY

Patented June 9, 1942

2,285,424

UNITED STATES PATENT OFFICE 2,285,424

METHOD OF MANUFACTURING FOILLIKE LAYERS

Eckard Fenner, Berlin, Germany, assignor to Süddeutsche Apparate-Fabrik G. m. b. H., Nuremberg, Germany, a company Application November 28, 1939, Serial No. 306,519
In Germany December 14, 1938

4 Claims. (Cl. 117—110)

The invention relates to the manufacture of foil-like layers, especially those made of metallic material.

It is well-known to produce layers of this kind on an auxiliary body, on which they are formed as a coherent substance by cathodic disintegration or any other known or suitable process, and then to dissolve this body by means of an agent that does not affect the layer produced in this way.

In many cases, after this layer has been freed from the auxiliary body it rolls itself up in the liquid solvent and is then difficult to uncoil. Also, the layer when removing it from the solvent may happen to be torn by the resistant surface tension of the solvent.

According to the invention these disadvantages are overcome by employing as auxiliary body, intended to carry the layer, a body capable of sublimation, so that on sublimation thereof the layer is left as a separate member. In this connection any substance capable of sublimation will be suitable, provided that it can be given the desired shape. For instance, solid carbon dioxide, camphor, or ammonium chloride may be employed here.

In the accompanying drawing

Figure 1:
Figure 2:
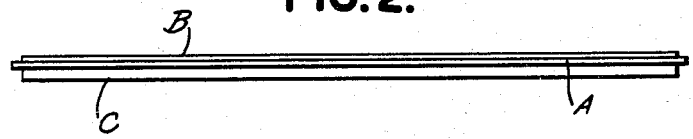
Figure 3:
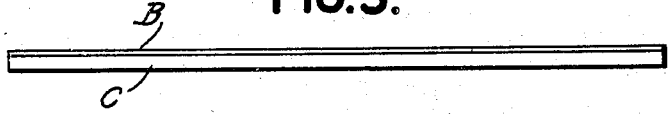

Fig. 1 is a diagrammatic side view of an auxiliary body and of a layer produced on it, while Figs. 2 and 3 are views which are similar to Fig. 1 and serve to explain a mode of employing the novel method.

A denotes the auxiliary body capable of sublimation, and B designates a layer applied to it by means of any method well known in the production of foil-type layers, such, for example, as cathodic disintegration, vacuum vaporization, squirting or die-casting, centrifuging, rubbing-on, galvanic or chemical deposition, etc. Also any suitable combination of these methods may be useful.

Fig. 2 shows some article or object C which is to be provided with the layer B. This may be done as follows. The auxiliary body A is placed on such body C, is then provided with layer B and finally is made to sublime so as to leave the layer B as a coating on article C. It is also possible first to equip the body A with layer B and then to place the assembly A, B onto article C. In both cases the layer B will be transferred to C by the sublimation of A.

If layer B is produced in a vacuous space the formation of air cavities between B and C will be obviated thereby.

What is claimed is:

1. The method of coating an article with a foil-like layer and which consists in placing on this article an auxiliary body capable of sublimation, then producing said layer as a coherent substance carried by such auxiliary body, and finally sublimating this body in a vacuum.

2. The method of coating an article with a foil-like layer and which consists in producing this layer as a coherent substance applied to an auxiliary body capable of sublimation, then placing such body with the layer thereon onto the said article, so that this layer is spaced from such article by said body, and finally sublimating this body.

3. The method of coating an article with a foil-like layer which comprises placing an auxiliary body of material capable of sublimation and a layer of foil-like material on said article, said body being between said layer and said article, and thereafter sublimating said body in a vacuum.

4. The method of coating an article with a foil-like layer and which consists in producing this layer as a coherent substance applied to an auxiliary body capable of sublimation, then placing such body with the layer thereon onto the said article, so that this layer is spaced from such article by said body, and finally sublimating this body in a vacuum.

ECKARD FENNER.